March 13, 1928.
E. BOSSI
LIQUID FUEL FEED
Filed July 13, 1921
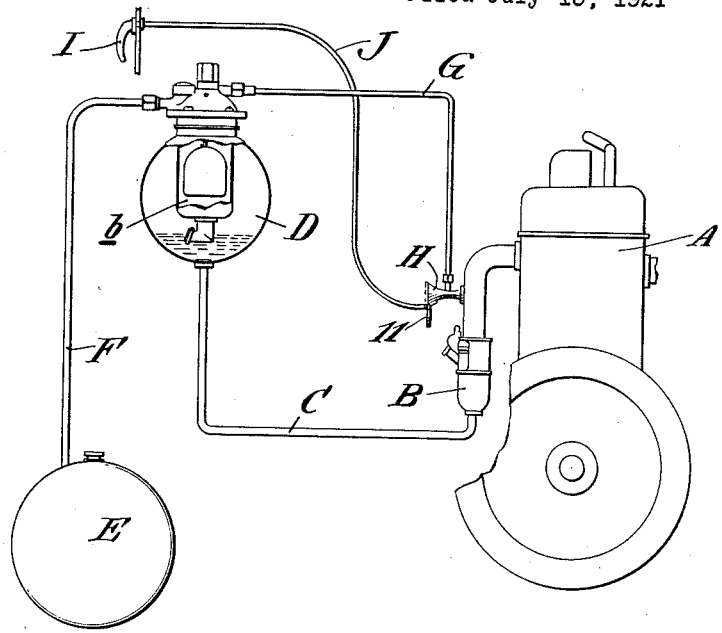
Fig. 1.
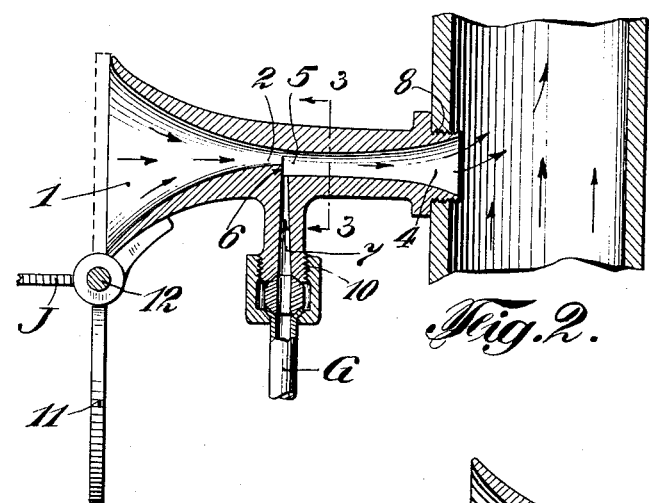
Fig. 2.
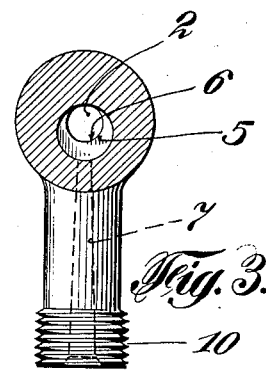
Fig. 3.
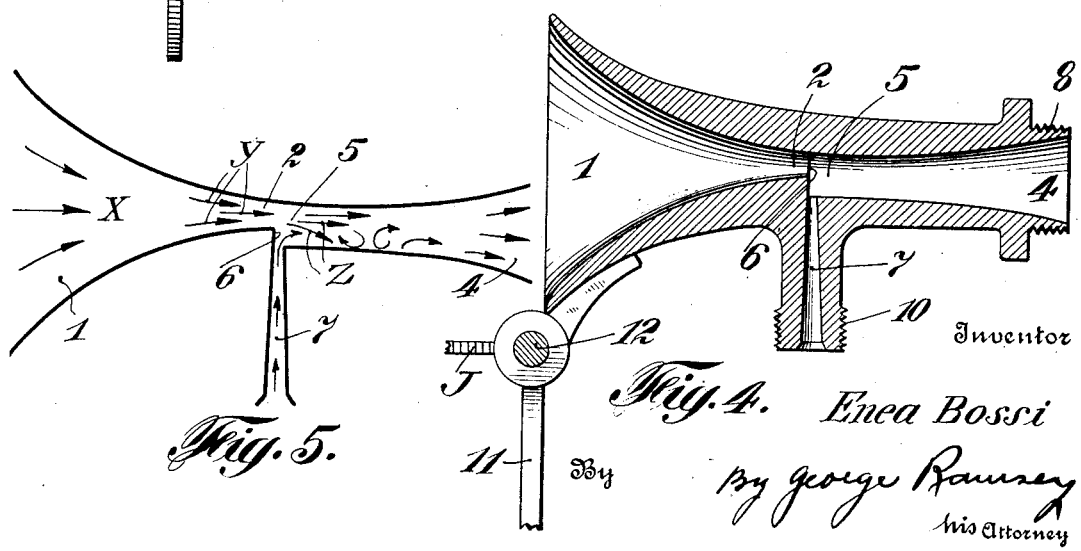
Fig. 5.
Fig. 4.
Inventor
Enea Bossi
By George Ramsey
his Attorney Patented Mar. 13, 1928.

1,662,101

UNITED STATES PATENT OFFICE.

ENEA BOSSI, OF NEW YORK, N. Y., ASSIGNOR, BY MESNE ASSIGNMENTS, TO STEWART WARNER SPEEDOMETER CORPORATION, A CORPORATION OF VIRGINIA.

LIQUID-FUEL FEED.

Application filed July 13, 1921. Serial No. 484,280.

The present invention relates broadly to liquid fuel feeds for hydrocarbon engines and more particularly to a means for increasing the effective vacuum in an auxiliary fuel feed tank.

The principal object of the present invention is a fuel feed system for gasoline engines and the like comprising an auxiliary vacuum tank above the carburetor to which gasoline is raised from the main reservoir by means of a partial vacuum created by the operation of the engine and wherein a device is provided to increase the effect of the vacuum produced on the suction stroke of the engine.

More specifically, the present invention comprises a device operative in connection with a vacuum fuel feed system and wherein the effective suction in the intake manifold of the engine is intensified or increased in order to render the partial vacuum in the vacuum tank more effective.

Still further, and more specifically, the present invention comprises for an object a vacuum feed fuel system wherein fuel from a main tank is raised to an auxiliary tank which is located above the carburetor by utilizing the partial vacuum produced on the suction stroke of the engine and wherein the partial vacuum is rendered more effective by a means adapted to admit supplemental air to the intake manifold of the engine.

Still more specifically, the present invention contemplates a form of Venturi tube aspirator connected to the engine intake manifold in such manner that the partial vacuum in the manifold is rendered more effective to withdraw air from a relatively small chamber in a vacuum feed tank to raise gasoline from a main tank into a vacuum auxiliary feed tank.

Still more specifically, the present invention contemplates a form of open Venturi tube aspirator adapted to be connected to an engine intake manifold in such manner that the partial vacuum in the manifold is rendered more effective to withdraw air from a relatively small chamber in a vacuum feed tank to raise gasoline from a main tank into a vacuum auxiliary feed tank, and wherein the conduit in the aspirator comprises two consecutive bores of different diameters and eccentrically arranged.

Still more specifically, the present invention contemplates a form of open Venturi tube aspirator adapted to be connected to an engine intake manifold in such manner that the partial vacuum in the manifold is rendered more effective to withdraw air from a relatively small chamber in a vacuum feed tank to raise gasoline from a main tank into a vacuum auxiliary feed tank, and wherein the conduit in the aspirator comprises two consecutive bores of different diameters and eccentrically arranged, and with the suction conduit entering the aspirator conduit adjacent the junction of the said force.

A still more detailed object of the present invention is an open Venturi tube aspirator adapted to be connected to the intake manifold of the engine and wherein the conduit in the Venturi tube is enlarged adjacent the inlet of the suction tube in such manner that the dynamic effect of air being drawn through the Venturi tube conduit increases the partial vacuum in the vacuum conduit over the partial vacuum in the manifold so that the suction in said conduit is more efficient than the direct suction from the manifold.

Other and further objects of the present invention will in part be obvious and will in part be pointed out hereinafter in the specification following by reference to the accompanying drawings forming a part of this application and wherein like characters are used to represent like parts throughout the several figures thereof.

It is realized that the present disclosure, which is specific of one embodiment of the present invention represents but one form of the invention and that the invention may be practiced in devices other than those herein illustrated and described.

Figure 1 is a diagrammatic view of the complete system embodying the present invention and illustrating in a diagrammatic manner the arrangement of the several parts to comprise a complete fuel feeding system for a hydrocarbon motor.

Figure 2 is a detail view illustrating the suction device attached to the manifold of a hydrocarbon engine.

Figure 3 is a sectional view taken on line 3—3 of Figure 2.

Figure 4 is an enlarged sectional view of the device shown in Figure 2.

Figure 5 is a diagrammatic view illustrating the action of the device.

In the art of gasoline engines used in motor boats, aeroplanes, and more specifically in automobiles, it is generally recognized that an even head of gasoline approaches the nearest to constant conditions which result in the best operation of a modern carburetor. To this end fuel feeding systems comprising small auxiliary tanks, located at a definite height above the carburetor and closely adjacent thereto in a lateral direction, have proven to be a simple and effective solution of the problem. Various means have been utilized for raising the fuel to the auxiliary tank. One of the means for the purpose has comprised the utilization of a suction produced on the suction stroke of the engine and to this end the auxiliary tank has usually comprised two chambers, one being a vacuum chamber which was alternately connected to the source of suction, namely, the engine, and to atmosphere, or it may be constantly open to atmosphere; while the other chamber comprises a storage chamber which receives the contents of a vacuum chamber when the source of suction was cut off from the vacuum chamber.

It has been customary to connect the vacuum chamber of the auxiliary tank directly to the intake manifold of the engine and to utilize the partial vacuum in the intake manifold as a source of suction. Where the partial vacuum in this manifold is relatively high as when the throttle is nearly closed, thereby cutting off the inrush of air to the manifold, the degree of suction or vacuum has been ample to raise gasoline as is desired. Where the throttle is wide open and a large volume of air is rushing through the manifold, the effective vacuum in the manifold is greatly reduced. At the same time, a relatively large volume of gasoline is being carried away from the carburetor. This condition requires that the auxiliary tank must operate at its maximum, so far as capacity is concerned, under conditions of minimum suction. These effects are encountered where an automobile is climbing a hill or where it is running through heavy mud or sand or any other time where the engine is doing heavy duty. Under these conditions it is not unusual for the vacuum system to fail, due to the fact that the demands for capacity cannot be kept up by the suction available.

To obviate the above conditions various types of "booster" devices have been proposed and it has been suggested that the manifold be constructed to form a throat adjacent the connection to the vacuum chamber of the auxiliary tank. This restriction or contraction in the manifold greatly interferes with the normal action of the manifold and is undesirable. It has also been proposed to connect the vacuum chamber of the auxiliary tank with an injector which is connected with the exhaust manifold of the engine whereby pressures from the exhaust gases is driven through the injector, thereby causing an injection effect to produce the partial vacuum in the conduit leading to the vacuum chamber and obtaining increased suction in this way. The burnt gases, however, are delivered directly into the intake manifold and devitalize the carbureted gas in the manifold and furthermore carbonized particles from the burnt gases are very liable to clog the injector. It has still further been suggested to provide an injector connected with the exhaust pipe which injector is adapted to operate as an auxiliary to the suction in the intake manifold and with the exhaust injector arranged to discharge the gases which are by-passed back into the auxiliary manifold. This system is open to substantially the same objections as the system just described.

The present invention overcomes the difficulties of the known prior art by providing an intensifier or "booster" which is connected directly to the manifold and which is in the form of a normally open Venturi tube aspirator wherein the conduit leading to the vacuum chamber of the auxiliary tube leads into the side of the Venturi tube. In this way supplemental air is admitted to the intake manifold and as this supplemental air passes the end of the vacuum conduit the dynamic action of the air particles produces a partial vacuum which for small volumes is more effective than the partial vacuum produced in the manifold itself. The Venturi tube, due to its construction, automatically regulates the amount of air being drawn in. In view of the fact that under relatively high suction the friction on the side walls of the Venturi tube increases and thus retards the action of the inrushing air and that this friction increases in proportion to the speed of the air, a very effective balance is maintained. Consequently the conditions in the Venturi conduits are more nearly constant than they are in the manifold itself. Even when the throttle is open and a large volume of air passing through the manifold, the dynamic action of the air being drawn through the Venturi tube causes a rush of air which produces a partial vacuum in the vacuum conduit that is more effective than the partial vacuum in the manifold. Consequently it is made effective to exhaust the relatively small vacuum chamber in the auxiliary tank even when the vacuum in the intake manifold is low and thus the vacuum chamber is filled with liquid fuel under the most adverse conditions so that an ample supply is maintained at all times in the storage chamber, which feeds the carburetor. When the throttle is closed the rush of air through the intake manifold is diminished and the partial vacuum therein is increased. This tends to cause a larger volume of air to try to rush through the Venturi conduit of the booster, with the consequential increasing of friction in the Venturi tube which automatically cuts down the inrushing air and thereby produces but a relatively small increased partial vacuum in the conduit leading to the vacuum chamber. However, the auxiliary storage tank is operating under easy duty at this time so that the supply of fuel is ample under these conditions.

A still further and important effect of the invention is the introduction of auxiliary air into the intake manifold, which auxiliary air is partially carbureted because the air being drawn through the vacuum conduit tube, which mingles with the incoming air through the booster, is a partially carbureted air and therefore this air intensifies and further gasifies the carbureted air in the manifold.

In the present invention the conduit of the Venturi tube is slightly modified from the usual form in that it is abruptly enlarged adjacent its smallest cross-section and the vacuum conduit enters the bore of the venturi adjacent this enlarged portion. The effect is to tend to provide an eddy at this point which eddy intensifies the aspiration effect because the main direction of the air current coming in through the funnel of the venturi is not broken or compressed by the air particles which are drawn in from the conduit leading from the vacuum chamber of the auxiliary tank.

Referring now to the drawings and more specially to Figure 1, a hydrocarbon engine A is provided with a carburetor B which is connected by a tube C with the storage tank $b$ of the auxiliary tank D. A main tank E is connected by means of a tube F with the vacuum chamber $b$ of the auxiliary tank D. The vacuum chamber is connected by means of a pipe G with the intensifier or booster H which may be cut in or out of operation as hereinafter described by a dashboard handle I through the medium of the flexible shaft or other connection J.

With the exception of the booster H the other elements in the diagrammatic view are old and well known in the art so that reference will now be more specially to Figures 2 to 5, which relate more particularly to the novel element of the invention. Figure 4 is a longitudinal section through the booster H which is provided with a funnel shaped opening 1, the sides of which gradually converge to the throat 2 which is the smallest cross-section of the bore. The inner end of the booster is also funnel shaped from the throat 2 and comprises an opening 4 of a lesser diameter than the opening 1 and which terminates at 5, at the throat of the booster, in a bore which is larger in cross-section than the cross-section 2. The bore 5 preferably is eccentrically arranged relative to the throat 2 as will be clear from inspection of Figures 3 and 4, and preferably with the maximum of eccentricity being on one side only. In other words, one wall of the throat 2 and the bore 5 preferably is a smooth continuous curve whereas the other wall is broken by a shoulder 6 which is crescent in form. An inlet or vacuum conduit 7 enters the bore of the booster H adjacent the wall 6. The inner end of the booster is screw threaded as at 8 or otherwise finished in such manner as to be capable of attachment to the manifold of an engine. The aspirating tube is in a similar manner screw threaded or otherwise fitted as at 10 to provide a suitable connection for the vacuum tube leading to the vacuum chamber $b$ of the auxiliary tank D. In normal operation of the device the booster is open because of the automatic counterbalancing effect previously described. However, in starting the engine, particularly if it is cold, it may be desirable to prevent the inlet of any supplemental air until after the engine is started. To this end a flap valve or door 11 may be hinged as at 12 at the mouth of the booster so that it normally occupies the full line of position indicated in Figures 2 and 4, and may be raised to the dotted line position in order to close the booster when desired as specified. This flap valve or door 11 may be operated by any suitable means such as the flexible shaft J connected with the dashboard handle I.

Referring now more specially to Figure 5 it will be noted that the arrows X at the mouth of the conduit indicate atmospheric air entering the funnel. This air is drawn in by the suction produced in the manifold. As the air rushes into the funnel opening it is compacted as indicated by the arrows Y and the velocity of the air is greatly increased. As the air leaves the wall 6 it tends to expand somewhat and strikes the lower side wall of the conduit tending to cause an eddy or swirling action which leaves a free zone as at Z into which the air drawn through the conduit 7 may escape. This action renders the intensifier still further effective than where a simple form of Venturi tube is relied upon. The present invention however contemplates any form of equivalent device capable of performing substantially the same function in substantially the same way.

Having thus described my invention, what I claim is:

1. An article of manufacture comprising an aspirator adapted to be connected to the manifold of a hydrocarbon engine and for producing a partial vacuum in a vacuum fuel feed system, said aspirator comprising a body portion provided with a funnel shaped bore at the outer end and terminating in a relatively small opening at the throat of the device, a shoulder adjacent the end of said opening and a larger bore at the inner end of said body portion, the wall opposite to the said shoulder being a smooth wall, with a transverse passage entering said body portion adjacent said shoulder.

2. An article of manufacture comprising an aspirator adapted to be connected to the manifold of a hydrocarbon engine and for producing a partial vacuum in a vacuum feed system, said aspirator comprising a body portion provided with a funnel shaped bore at the outer end and terminating in a relatively small opening at the throat of the device, a shoulder adjacent the end of said opening and a larger bore also slightly funnel shaped at the inner end of said body portion, and with a transverse passage entering said body portion adjacent said shoulder.

3. An article of manufacture comprising a vacuum pump comprising an aspirator adapted to be connected with a hydrocarbon engine in such a manner as to cause the flow of gas through said aspirator, said aspirator having a body portion provided with an opening comprising two bores, the outer bore being funnel shaped and the inner bore being eccentric relative to the outer bore and also being slightly funnel shaped, and a transverse conduit leading to the said opening and entering the same adjacent the junction of the two bores.

4. An article of manufacture comprising a booster for increasing normal vacuum in a vacuum fuel feed system or the like, said booster comprising a modified Venturi tube having the conduit thereof abruptly enlarged adjacent the throat of the Venturi tube, and a vacuum conduit connected to the Venturi tube adjacent said enlargement.

ENEA BOSSI.